(12) United States Patent
Hunt et al.

(10) Patent No.: US 7,151,265 B2
(45) Date of Patent: Dec. 19, 2006

(54) CHOPPED RADIATION SOURCE

(75) Inventors: Robert Nathan Hunt, Steubenville, OH (US); Atul Khettry, Wheeling, WV (US); Matthew Rey Vila, Wheeling, WV (US)

(73) Assignee: Bayer Materialscience LLC, Pittsburgh, PA (US)

( * ) Notice: Subject to any disclaimer, the term of this patent is extended or adjusted under 35 U.S.C. 154(b) by 156 days.

(21) Appl. No.: 10/983,404

(22) Filed: Nov. 8, 2004

(65) Prior Publication Data

US 2006/0097181 A1 May 11, 2006

(51) Int. Cl.
*G01J 1/42* (2006.01)
(52) U.S. Cl. .................................. 250/373
(58) Field of Classification Search ............ 250/373
See application file for complete search history.

(56) References Cited

U.S. PATENT DOCUMENTS

| 2,678,581 A | 5/1954 | Relsner ............... 88/14 |
| 3,536,910 A | 10/1970 | Ormrod et al. ........... 250/41.9 |
| 4,011,745 A * | 3/1977 | Gatos et al. ............ 73/31.06 |
| 4,233,512 A * | 11/1980 | Rupert .................. 250/338.1 |
| 5,653,537 A | 8/1997 | Ignatowicz et al. ........ 374/131 |
| 6,280,100 B1 | 8/2001 | Haake .................... 385/73 |
| 2002/0071123 A1 | 6/2002 | Miller et al. ............. 356/440 |

FOREIGN PATENT DOCUMENTS

GB 823667 11/1959

* cited by examiner

*Primary Examiner*—David Porta
*Assistant Examiner*—Marcus Taningco
(74) *Attorney, Agent, or Firm*—Joseph C. Gil; Lyndanne M. Whalen

(57) ABSTRACT

A chopped radiation source composed of a radiation source component, a chopping component and an optical fiber connector component. Each of these components is arranged within a housing in a manner such that the elements of each of these components will not move in an unintended manner during use.

34 Claims, 2 Drawing Sheets

Chopped Radiation Source - Isometric View

Chopped Radiation Source - Isometric View

Chopped Radiation Source - Front View

CHOPPED RADIATION SOURCE

BACKGROUND OF THE INVENTION

The present invention relates to a chopped radiation source, preferably, a chopped optical radiation source which is useful in analytical devices such as photometers and spectrophotometers, particularly in photometers for monitoring chemical production processes.

Photometric and spectrophotometric devices for analyzing materials and monitoring reaction processes are known and commercially available. These devices compare radiation emitted by a source with radiation from that same source which has been transmitted through and altered by the sample material being evaluated.

One technique employed for improving the accuracy of measurements made with photometers and spectrophotometers is "chopping" of the radiation. In this technique, the radiation flow is interrupted at regular intervals or "chopped". A chopped signal is necessary for AC coupling of amplifier stages in order to improve thermal stability. A chopped signal allows the use of electronic filters tuned to the chopped frequency to reduce background noise. Use of a chopper reference signal allows signal processing, sometimes referred to as lock-in amplification, to reduce background noise.

Electronic filters and a reference signal are employed, for example, in the signal comparison apparatus described in U.S. Pat. No. 2,678,581. In this disclosed apparatus, a beam of light is interrupted or pulsed at some predetermined frequency by a motor-driven rotating shutter or chopper wheel. A rotating sectored mirror is used to deflect the light pulses along one of two paths, and effectively acting as a second chopper at a lower pulse rate. Two fixed mirrors direct the light pulses toward a second rotating sectored mirror, in phase with the first rotating sectored mirror, to direct light toward a light sensitive element. Various properties of a sample, such as spectral characteristics or reflectance characteristics, may be compared by means of suitable devices positioned in the path(s) of the directed light pulses. The light pulse repetition rate is made substantially greater than the beam switching rate by providing a number of open sectors in the shutter and by using complementary half-round sectored mirrors. The light pulses received by the light sensitive element are converted to electrical pulses, which are capacitatively coupled between amplifier stages to eliminate temperature dependent DC drift. The signal is passed through electronic filters tuned to the chopper frequency to restrict bandwidth and reduce background noise. The signal is then processed by a lock-in amplifier that is mechanically synchronized with the chopping rate of the beam switching sectored mirrors. This results in decreased bandwidth, decreased noise and increased sensitivity.

One disadvantage of using a rotating chopper wheel such as that disclosed in U.S. Pat. No. 2,678,581 is the wear on the moving parts and chopper frequency stability. A tuning fork chopper, however, has no wearing movable parts and has a natural resonant frequency. For these reasons, a tuning fork chopper has been used in a number of deep space experiments where reliability is essential. Such a chopper is made in the USA by Electro-Optical Products Corporation and available from Boston Electronics Corporation. However, a tuning fork chopper is not suitable for use in all applications, particularly where there are space limitations. A vibrating reed chopper is used for those applications in which there are spatial constraints because it can be packaged in a smaller space than a tuning fork chopper.

Optical choppers have also been used in devices such as the infrared thermometer disclosed in U.S. Pat. No. 5,653,537 in which light emitted from an object is conveyed to a detector via fiber optic cable. The detector generates electrical outputs. These outputs or signals are then amplified and linearized. Unlike the prior art pyrometers, however, the pyrometers disclosed in this patent do not continuously collect and repeatedly chop the collected light before it enters the detectors. Rather, the collected infrared light is reflected off of a dichroic mirror and then passed through a piezoelectric chopper to chop the infrared light. Chopping is achieved through oscillation of a vibrating reed driven by piezoelectric elements. The chopped infrared light then enters a fiber optic cable and is relayed via that cable to an infrared detector which refocuses the light and then beam-splits the infrared light into two broad wavelength bands. One of these two broad wavelength bands is narrowed by an optical filter and detected by an infrared detector. The other broad wavelength band is directly detected by another infrared detector whose upper wavelength cutoff limits the wavelength band. The detectors generate an AC signal which is then amplified and linearized before being relayed to an analog to digital converter which generates the signal sent to a microprocessor.

In these and most other known photometric, spectrophotometric and pyrometric devices, alignment of the light source with the means for relaying that light to the sample and to the detector is one factor which influences the accuracy of the measurement and restricts the locations at which such devices must be placed to sites remote from the reactors in which chemical reactions are being conducted. The known devices also present problems with adjustment of the duty cycle of the chopping device. Use of moving parts subject to wear and tear also introduces the potential for inaccuracy and reliability problems.

It would therefore be advantageous to develop a chopped radiation source assembly which could be readily included in photometric, spectrophotometric and other types of analytical devices even when those devices are positioned in production areas without the need for realignment of light source with the chopper on a continuing basis or interruption of measurement for replacement of worn moving parts after a limited number of uses.

SUMMARY OF THE INVENTION

It is an object of the present invention to provide a chopped radiation source, preferably, an optical radiation source which can be readily incorporated into analytical devices even when the analytical devices are located in production environments.

It is another object of the present invention to provide a chopped radiation source, preferably, an optical radiation source with reduced drift and improved signal to noise ratio.

It is a further object of the present invention to provide a chopped radiation source, preferably, an optical radiation source which is characterized by ease of alignment of the radiation source and adjustment of chopper duty cycle.

It is also an object of the present invention to provide a chopped radiation source, preferably, an optical radiation source having a minimum number of moving parts.

It is a further object of the present invention to provide a chopped radiation source having an integrated detector to control the intensity of the radiation.

It is another object of the present invention to provide a chopped radiation source having an integrated means of coupling the chopped radiation from the source into an optical fiber for transfer to a remote location.

It is also an object of the present invention to provide a chopped radiation source having a means for extracting a portion of the chopped beam from the radiation source that is coupled into an optical fiber without reducing the total energy throughput of the fiber.

It is a further object of the present invention to provide a chopped radiation source having an integrated detector which is driven by an extracted beam from the fiber to output an electrical pulse in phase with the chopper to synchronize a lock-in amplifier.

These and other objects which will be apparent to those skilled in the art are accomplished by the device of the present invention which is formed by housing the radiation source, optical chopping and optical fiber connector components described more fully herein in a manner such that those components remain in position during use.

DETAILED DESCRIPTION OF THE PRESENT INVENTION

Figure 1:
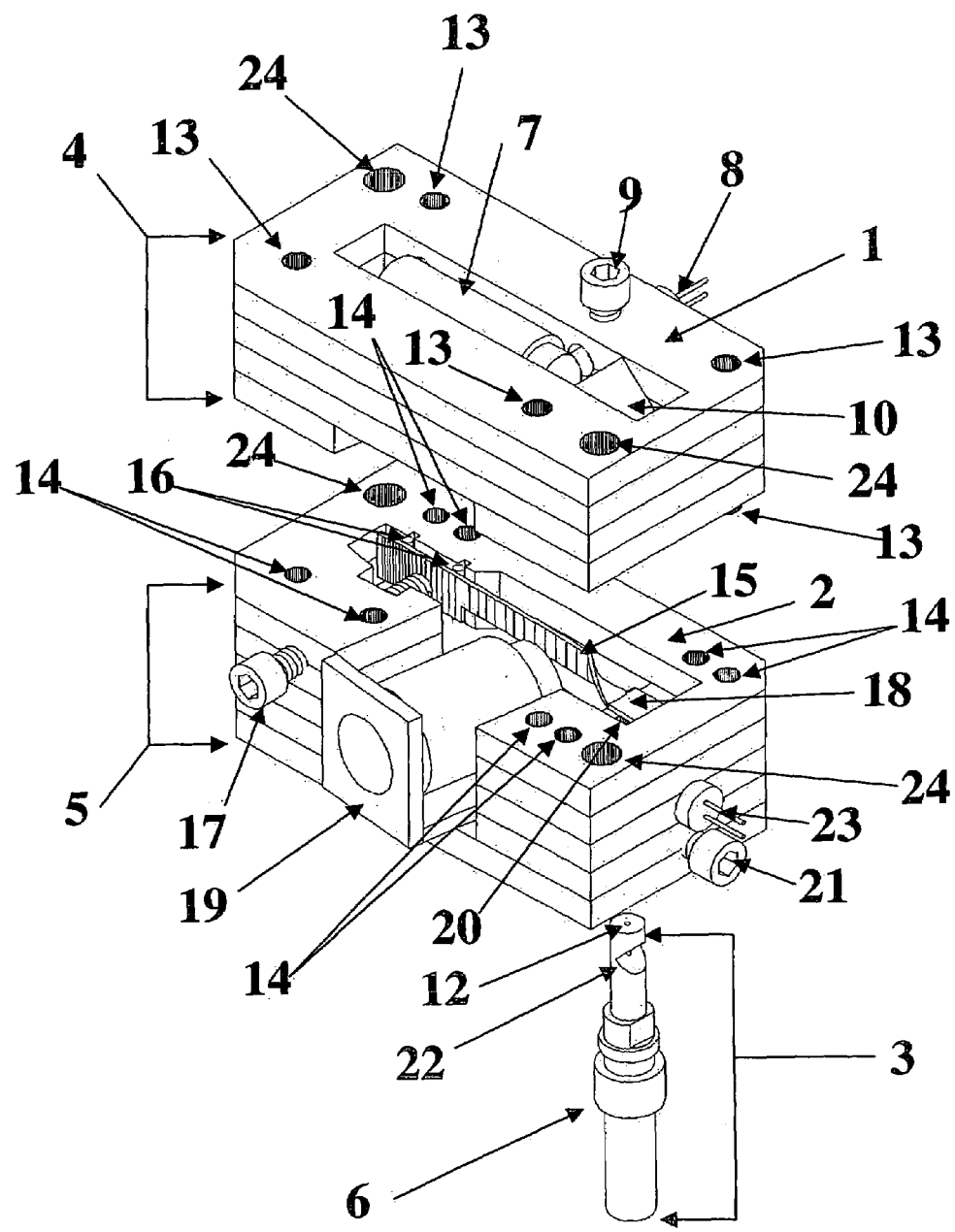
FIG. 1 is an isometric view of one embodiment of the chopped radiation source of the present invention in which the radiation source component, the chopping component, and the optical fiber connector component are shown in detail.

The present invention relates to a chopped radiation (preferably, optical radiation) source which is suitable for use in photometers, spectrophotometers and other analytic devices in which chopping of radiation is used to enhance instrument accuracy or performance.

The chopped radiation source of the present invention is composed of (1) a radiation source component, (2) a chopper component, and (3) an optical fiber connector component. Each of these components is positioned in a housing in a manner such that the elements of each of these components will not move in an unintended manner during use.

The key elements of the radiation source component are (a) a radiation source and (b) means for directing the radiation emitted by the source to a focal point. In the event that the radiation emitted by the radiation source in not collimated or collimated to the desired extent, a means for collimating the radiation may be advantageously included in the radiation source component.

The key elements of the chopping component include (a) a reed which is capable of resonating and which is fixed at one end and free to move at the other end, (b) a chopper flag positioned at an angle (preferably a 90° angle) with respect to the movable end of the reed, (c) means for adjusting pressure on the reed, (d) means for causing the reed to vibrate at its resonant frequency, and (e) a radiation detector. The pressure adjusting means (c) should make it possible to align the chopper flag when it is at rest with the focal point of the radiation from the radiation source component (1). The radiation detector (e) should be positioned so that it will receive chopped radiation emanating from the optical fiber connector component.

The key elements of the optical fiber connector component include (a) optical fiber and (b) a housing with (c) an opening. The optical fiber is positioned so that it terminates at the focal point of the radiation from the radiation source component (1). The housing for the optical fiber encases most of the optical fiber and will generally serve as the means for holding the optical fiber in the correct position. The opening (c) in housing (b) leaves a minor portion of the optical fiber exposed. This opening (c) is positioned so that any radiation emitted through that opening can be detected by radiation detector (e) of component (2).

In one of the preferred embodiments of the present invention, means for detecting the intensity of the radiation emitted by the source and means for adjusting the amount of radiation to be chopped are included in the radiation source component.

In another preferred embodiment of the present invention, the chopper flag is formed from a section of the resonating reed at the movable end of that reed.

In another embodiment of the invention, a lock-in amplifier is synchronized with the output of an electrical pulse which is in phase with the chopper which electrical pulse is derived from the radiation emitted at the opening of the optical fiber component housing.

The chopped radiation source of the present invention will be described in greater detail with reference to FIGS. 1 and 2.

Figure 2:
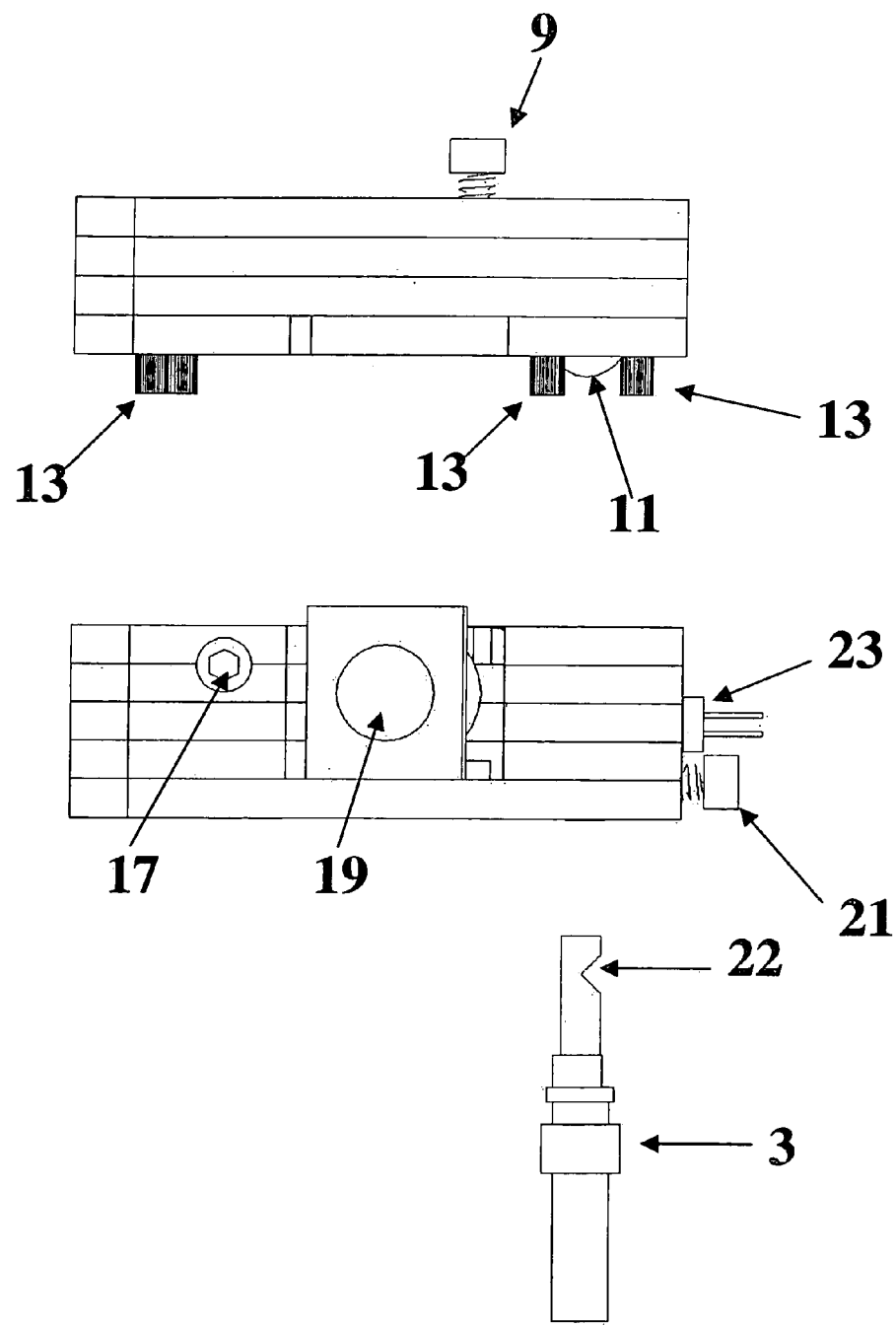
FIG. 2 is a front view of the embodiment of the chopped radiation source shown in FIG. 1.

In each of FIGS. 1 and 2, the three major components of the device of the present invention, i.e., the radiation source component 1, the chopper component 2, and the optical fiber connector component 3 are illustrated. The housing 4 for radiation source component 1, the housing 5 for chopper component 2, and connector 6 of optical fiber connector component 3 must each be made of a material which will withstand the environment in which the device is to be used and which is sufficiently rigid to support the elements of each of these components in a manner such that those elements will not move or shift during use of the chopped radiation source. Housings 4 and 5 and connector 6 are each preferably made with a metal such as aluminum, stainless steel or brass, but any other materials which are sufficiently strong and durable enough to withstand the conditions under which the device will be used may also be employed. The housings 4 and 5 shown in FIGS. 1 and 2 were made of aircraft grade aluminum, alloy 6061, metal plates which had been laser cut to accommodate the elements to be included in that housing. These plates were then stacked and bonded together. Although not a required feature of the invention, holes 24 into which screws may be inserted are shown in FIG. 1 to illustrate one method for mounting the device of the present invention to a bench or post or other surface at the location where the device is to be used. Other means for holding the stacked plates and mounting the housing formed by such plates will be apparent to those skilled in the art. It would also be possible to "mold" sections of the housing(s) and attach it/them by any of the techniques known to those skilled in the art. The housings 4 and 5 must be at least large enough that all of the required components will fit within the housing(s) in a manner such that each of those components may function properly and will not move in an unintended manner during use. It is, of course, desirable that the housings be as small as possible for reasons of space and economy but there is no technical limitation with respect to the maximum size of the housings.

In housing 4, a collimated radiation source 7 is positioned in an opening which is large enough to accommodate that radiation source. Radiation source 7 must remain stationary in housing 4. It is preferred that radiation source 7 be maintained stationary by making the opening into which radiation source 7 is placed sufficiently large to allow it to be placed in that housing 4 but small enough that radiation source 7 will not be free to move around. It is, however, possible to make radiation source 7 stationary by inserting radiation source 7 into a casing or base permanently mounted to housing 4 which casing or base has been designed to hold the radiation source in place. Radiation source 7 may be any source of visible, ultraviolet and/or near infrared ("NIR") radiation known to those skilled in the art. It is preferred that the radiation emitted by radiation source 7 be collimated, however, it is within the scope of the present invention to use any source of radiation. Radiation which is not collimated when emitted may be made collimated by techniques known to those skilled in the art, such as passage through an aspheric lens. Examples of preferred radiation sources include tungsten filament lamps and light emitting diodes. Selection of an appropriate radiation source will, of course, be dependent upon the particular application for which the chopped optical source will be used.

It is desirable that the intensity of the radiation source be held at a constant level. While intensity adjustment is not necessary when the radiation source is selected to meet the specific requirements for that optical chopper or when that radiation source will be replaced before it nears the end of its useful life, it is generally advantageous to include means for adjusting the radiation intensity because such adjustability allows greater flexibility in selection of the radiation source and the ability to continue use of the radiation source after it has passed its peak performance.

In the embodiment of the invention illustrated in FIG. 1, radiation intensity adjustment may be accomplished by monitoring the radiation from source 7 with detector 8 and using the output of detector 8 to drive a servo feedback loop (not shown) controlling the radiation source 7 drive. The set point of the source 7 drive may be adjusted by means of an adjustable optical iris 9 (also shown in FIG. 2). It is, of course, possible to operate the chopped radiation source assembly without detector 8 and iris 9. However, it is preferred that these elements or some other elements known to be useful for adjusting radiation intensity be included in radiation source component 1.

Any of the known radiation detectors which is capable of detecting radiation at the wavelengths selected for use in the device of the present invention may be used as detector 8. Preferred detectors include phototransistors and photoconductive or photovoltaic silicon diodes. Any means for increasing or decreasing the amount of radiation emitted from radiation source 7 may be used as radiation adjuster or iris 9. Suitable adjustment means are known to those skilled in the art. Such adjustment means include a fine thread screw.

In the embodiment of the invention illustrated in FIG. 1, radiation source 7 is positioned in housing 4 so that the emitted collimated radiation will reach beam director 10. Beam director 10 is employed in this embodiment of the invention because the condensing means 11 and optical fiber 12 are not on axis with source 7. Beam director 10 need not be included in radiation source component 1, however, if condensing means 11 and optical fiber 12 are on the same axis as the collimated radiation emitted by radiation source 7.

In the apparatus illustrated in FIG. 1, beam director 10 is positioned in housing 4 so that it can receive radiation from radiation source 7 and direct that received radiation to radiation condensing means 11. It would, however, also be possible to position beam director 10 in housing 5 provided that beam director 10 would still be capable of receiving collimated radiation and directing such received radiation to the means for directing the collimated radiation to a focal point. Beam director 10 may be any of the known means for directing radiation such as mirrors or prisms. Preferred beam directors include beam steering prisms and mirrors. When used, beam director 10 should be at least large enough to capture the collimated radiation, preferably, it will have a width which is approximately equal to the diameter of radiation source 7.

The radiation condensing means 11 need not be positioned in housing 4 as shown in FIG. 2. Radiation condensing means 11 may also be positioned at any point where it is capable of receiving the collimated radiation emitted from radiation source 7 and condensing that radiation to a focal point. It is preferred, however, that radiation condensing means 11 be located in housing 4 at a point below beam director 10.

Radiation condensing means 11 may be any of the known radiation condensers. Ball lenses, particularly sapphire ball lenses having diameters of from 1 to 10 mm are preferred. Condensing means 11 condenses the radiation to a focal point (not shown) at which optical fiber 12 is positioned to receive that radiation.

Located at the base of housing 4 are alignment posts 13 (more clearly illustrated in FIG. 2). The alignment posts 13 are positioned to fit into receiving cavities 14 located in housing 5 and thereby form the complete housing for the chopped optical source of the present invention. It is also within the scope of the present invention to position receiving cavities 14 at the base of housing 4 and alignment posts 13 at the top surface of housing 5. The number of alignment posts 13 and receiving cavities 14, if used, will generally be at least 2 alignment posts and 2 receiving cavities, preferably, at least three posts and 3 cavities, most preferably, 4 alignment posts and 4 receiving cavities. These alignment posts 13 and receiving cavities 14 are not essential features of the present invention but they are advantageously included because they facilitate proper alignment of the housings 4 and 5 and thus proper alignment of the elements included in those housings. The alignment posts 13 may be made of any material which will withstand the conditions of use. Metals such as rolled metal pins are particularly preferred. Alignment posts 13 and cavities 14 will be sufficiently long or deep that the completed housing will remain intact and both housings 4 and 5 will not move or shift during use.

A reed 15 which is capable of vibrating is positioned in housing 5 so that the movement of chopper flag 18 will chop the beam entering optical fiber 12. In the embodiment of the invention illustrated in FIG. 1, reed 15 is positioned so that it is vertical with respect to the opening in housing 5. Such vertical positioning is preferred. One end of reed 15 is capable of relatively free movement while the reed's movement at the other end is restricted by supports 16 and the means for adjusting chopper duty cycle 17. At the end of reed 15 which is capable of relatively free movement is located chopper flag 18. Chopper flag 18 may be formed from the terminal portion of reed 15 or it may be attached to the movable end of reed 15. In the chopper assembly illustrated in FIG. 1, the chopper flag 18 was formed by twisting the terminal portion of reed 15 ninety degrees. Any of the chopper flags known to those skilled in the art may, however, be used. The chopper flag 18 shown in FIG. 1 is particularly advantageous in that there is no risk of separation of the chopper flag from the reed.

Reed 15 may be made of any flexible material which can be made to vibrate. Suitable materials include ferrous metals, spring steel, and sufficiently stiff polymer film. Ferrous metals are preferred when the means for causing the reed to vibrate is a solenoid coil. Any of the known piezoelectric resonating reeds may also be used as reed 15. Where a piezoelectric resonating reed is used, the preferred actuating material is a polyvinylidene fluoride such as that which is commercially available under the designation Kynar PVDF. Reed 15 should generally be long enough that the reed 15 with, chopper flag 18 will have a natural resonance between 100 and 1000 Hz, and have a deflection greater than twice the diameter of optical fiber 12. In order to adjust the resonance frequency of reed 15, the reed length, thickness, width, Young's modulus of the reed material, or weight of the chopper flag 18 may be varied to achieve the desired frequency. The optimum resonance frequency of the reed depends upon the principal detector used in the spectrometer or photometer or other analytical device into which the chopped radiation source of the present invention will be incorporated. For a lead sulfide detector, the optimum resonance frequency is 600 Hz.

In the device illustrated in FIGS. 1 and 2, the vibrating reed was fabricated from spring steel stock approximately 1.6 inches (4.0 cm) long, 0.19 inches (0.5 cm) wide, and 0.023 inches (0.058 cm) thick. The vibrating reed portion beyond the supports 16 was approximately 1.0 inches (2.5 cm) long and 0.09 inches (0.23 cm) wide. The chopper flag 18 portion, was formed from the terminal portion of reed 15 and was 0.15 inches (0.38 cm) long and 0.19 inches (0.48 cm) wide. This reed/flag assembly resonated at approximately 450 Hz.

Means for causing reed 15 to vibrate are well known in the art. In FIGS. 1 and 2, vibration of reed 15 is induced by solenoid 19. It is also possible to use a piezoelectric resonating reed as reed 15. When a piezoelectric resonating reed is used, solenoid 19 is not needed to cause vibration of the reed and the solenoid 19 can be omitted from the chopping component.

The chopper duty cycle may be adjusted by any of the techniques known to those skilled in the art. The chopper duty cycle adjuster 17 shown in FIGS. 1 and 2 is a screw which when turned sufficiently applies pressure to or removes pressure from reed 15. Application or withdrawal of pressure on reed 15 between supports 16 causes the reed to bend and chopper flag 18 to change its position. When chopper flag 18 is positioned between radiation condensing means 11 and the focal point at which optical fiber 12 receives the condensed radiation in a manner such that the edge of chopper flag 18 at rest is aligned over the center of the optical fiber 12 and blocks 50% of the optical fiber face, it will generate a 50% duty cycle on the chopped radiation from source 7. A change in the at rest position of chopper flag 18 changes the duty cycle of the chopped beam. A chopped radiation beam when detected and processed by a lock-in amplifier will produce a maximum signal with a 50% duty cycle.

Optical fiber connector component 3 is made up of connector housing 6, optical fiber 12 and opening 22. Optical fiber 12 is positioned within connector housing 6 in a manner such that at least a portion of optical fiber 12 will be exposed at opening 22. It is preferred that optical fiber 12 be secured within connector housing 6 in some manner, preferably with an adhesive material of some sort. Clear epoxy is particularly preferred.

In the chopped radiation source shown in FIGS. 1 and 2, optical fiber 12 terminates in the fiber connector housing 6 which is positioned at a location such that condensed, chopped radiation will be received by optical fiber 12 at the focal point of the radiation which has passed through condenser 11. In FIG. 1, optical fiber connector 6 is inserted into cavity 20 of housing 5. Fiber connector housing 6 is secured in place in housing 5 with screw 21. It could, however, also be made to snap or screw into place or be secured by means of an adhesive or in any other manner known to those skilled in the art. Opening 22 of connector housing 6 exposes the optical fiber 12 and any material present on the surface of that fiber (e.g., epoxy) to detector 23. Although opening 22 is shown as a V-shaped notch in FIGS. 1 and 2, no particular shape for opening 22 is required. Opening 22 could also be a straight mill cut on the surface of connector 3 or any other shape which exposes at least a portion of optical fiber 12. Opening 22 need not be any particular size but it is preferred that the opening be at least large enough to permit sufficient radiation to be detected by detector 23. In the device illustrated in FIGS. 1 and 2, opening 22 was large enough to expose 0.125 inches (0.317 cm) of optical fiber.

It is known to those skilled in the art that not all radiation beam rays incident on the end face of an optical fiber will successfully propagate along the inner core of the fiber and emerge at the other end. Only those rays within the fiber acceptance cone angle will propagate along the inner core. Those rays outside of the acceptance cone angle will refract into the fiber cladding and be lost. It is these "lost" rays which are detected by radiation detector 23 through opening 22. Where the optical fiber is held in place within housing 6 by an adhesive, a portion of the rays that refract into the cladding will penetrate the adhesive (preferably, epoxy) cementing the fiber 12 to the connector housing 6 and illuminate the epoxy or adhesive. The radiation that is illuminating the epoxy may be readily detected by radiation detector 23 which detects the phase of chopped radiation cycle modulated by optical chopper flag 18.

Selection of the optical fiber to be used in the apparatus of the present invention is based upon the particular type of radiation which is to be chopped and is within the skill of the art. For example, where the radiation being chopped is in the near infrared (NIR) range, glass fiber having a very low hydroxyl (OH) content is preferred because OH hydroxyl content absorbs around 1400 nm and would adversely affect transmission of the NIR radiation. However, where the radiation being chopped is in the ultraviolet (UV) range, the hydroxyl content of the optical fiber does not interfere with the transmission of UV radiation. The optical fiber used in the apparatus of the present invention will generally have a diameter of from about 300 to about 1000 μm, preferably from 400 to 600 μm and be capable of multimode ray propagation.

Fiber 12 in connector component 3 may be used to connect the chopped radiation source of the present invention to a probe (not shown) to be inserted into the material or stream being evaluated. Any of the known probes may be used with the radiation chopping device of the present invention. Selection of the probe will be based upon the type of analysis being conducted and the nature of the material or stream being analyzed.

Fiber 12 in connector component 3 may also be used to connect the chopped radiation source of the present invention with other analytical devices.

At section 22 of fiber connector component 3 illustrated in FIGS. 1 and 2, the epoxy on the surface of optical fiber 12 is illuminated with rays entering fiber 12 at an angle greater than the fiber acceptance angle which have penetrated the cladding and then the epoxy. These illuminating rays can be used to monitor radiation that is falling on the face of the fiber without reducing the amount of radiation being transmitted within the fiber core.

Having thus described our invention, the following Example is given as being illustrative thereof.

EXAMPLE

A device corresponding to that shown in FIGS. 1 and 2 was constructed of the following materials:

| | |
|---|---|
| Housing 4 | 6061 alloy aluminum plates which were laser cut to accommodate elements of the radiation source component 1, stacked and joined together with epoxy and steel roll pins. |
| Housing 5 | 6061 alloy aluminum plates which were laser cut to accommodate the elements of chopper component 2, stacked and joined together with epoxy and steel roll pins. |
| Housing 6 | Fabricated from a standard fiber optic SMA Connector |
| Radiation source 7 | Tungsten filament lamp which emitted radiation at wavelengths of from 400 nm to 2500 nm which is commercially available from Gilway Lamps (# I1025). |
| Radiation intensity detector 8 | Detector which is commercially available from DigiKey (Part # QSC114-ND). |
| Radiation intensity adjuster 9 | 4/40 machine screw |
| Beam director 10 | A first surface mirror having a width of 0.25 inches.(0.635 cm). |
| Radiation condenser 11 | A sapphire ball lens having a diameter of 0.25 inches (0.635 cm) which is commercially available from Edmund Scientific (# H43-831). |
| Optical fiber 12 | 500 um diameter low OH glass fiber from RoMack Fiber Optics |
| Alignment posts 13 | 1/16 inch steel roll pins having a length of 0.625 inches (1.59 cm). |
| Receiving cavities 14 | Cut in housing 5, 0.125 inches deep (0.318 cm). |
| Reed 15 | Fabricated from Stihl rewind spring (Part # LB05A02) measuring 0.187 inches (0.475 cm) wide by 0.024 inches (0.061 cm) thick. The first section in contact which bridge posts 16 measured 0.438 inches (1.11 cm) long by 0.187 inches (0.475 cm) wide. The second section which was free to move measured 1.00 inch (2.54 cm) long by 0.188 inches (0.47625 cm) wide. |
| Bridge posts 16 | 1/32 inch steel pins which were 0.25 inches long (0.635 cm). |
| Chopper duty cycle adjuster 17 | 4/40 machine screw |
| Chopper flag 18 | Terminal section of reed 15 at a 90° angle to the stationary portion of reed 15 and measuring 0.150 inches (0.381 cm) long and 0.189 inches (0.48 cm) wide. |
| Solenoid 19 | Solenoid coil removed from a Tyco relay (Part # T90S1D12-5) |
| Cavity 20 | Cavity cut out of housing 5 measuring 0.125 inches (0.317 cm) in diameter and 0.5 inches (1.27 cm) long. |
| Connector Screw 21 | 4/40 machine screw |
| Opening 22 | Opening exposing 0.125 inches (0.317 cm) of optical fiber machined from housing 6. |
| Phase Detector 23 | Detector which is commercially available from DigiKey (Part # QSC114-ND). |

Although the invention has been described in detail in the foregoing, it is to be understood that such detail is solely for that purpose and that variations can be made therein by those skilled in the art without departing from the spirit and scope of the invention except as it may be limited by the claims.

What is claimed is:
1. A chopped radiation source comprising:
 a) a radiation source component comprising:
  (1) a radiation source in a fixed position
  (2) means for collimating radiation emitted by said radiation source, if the radiation emitted by said radiation source is not already collimated, and
  (3) means for directing collimated radiation to a focal point,
 b) a chopping component comprising:
  (1) a reed which at one end is capable of moving freely and at the other end is relatively fixed,
  (2) a chopper flag positioned at a 90° angle with respect to the end of the reed which is capable of moving freely,
  (3) a means for adjusting pressure on the reed in a manner such that the chopper flag when at rest will be aligned with the focal point of the collimated radiation,
  (4) means for exciting the reed sufficiently to cause the reed to vibrate at its resonant frequency, and
  (5) a radiation detector positioned to receive and detect chopped radiation emanating from an optical fiber connector component, and
 c) the optical fiber connector component comprising:
  (1) optical fiber positioned so that one end receives radiation at the focal point of the collimated radiation,
  (2) a housing for the optical fiber with
  (3) an opening positioned so that radiation emitted through the opening will be received by the detector in said chopping component in which said radiation source component, said chopping component, and said optical fiber connector component are maintained in its proper position within a housing.
2. A chopped optical radiation source comprising:
 a) a radiation source component comprising a first housing composed of a material which is sufficiently rigid to support elements present therein in a manner such that those elements will not drift or move during use in which the elements comprise:
  (1) an optical radiation source,
  (2) means for collimating radiation from (1), if necessary, and
  (3) means for directing collimated radiation to a focal point,
  (4) optionally, means for detecting intensity of radiation from said optical radiation source,
  (5) optionally, means for adjusting intensity of the radiation from said optical radiation source,
 b) a chopping component comprising a second housing composed of a material which is sufficiently rigid to support elements present therein in a manner such that those elements will not drift or move during use in which the elements comprise:
  (6) a reed with a first end fixed to a wall of the second housing and a second end capable of moving freely,
  (7) a chopper flag positioned at a right angle to the second end of the reed and which is positioned to receive vibration originating from the reed to chop optical radiation from said optical radiation source at the focal point,
  (8) means for adjusting pressure on the reed to align the chopper flag's resting point, with the collimated radiation and the focal point,
  (9) a means for causing the reed to vibrate at the reed's resonant frequency,
  (10) a cavity for holding an optical fiber connector component such that an optical fiber is positioned at the focal point,

(11) a means for securing the optical fiber connector component when it is positioned in said cavity, and

(12) a radiation detector positioned to receive and detect chopped radiation emanating from an opening in the optical fiber connector component when the connector component is positioned in said cavity, and c) an optical fiber connector component capable of being positioned in said cavity comprising a third housing composed of a material which is sufficiently rigid to support elements present therein in a manner such that those elements will not drift or move during use which elements comprise:

(13) an optical fiber with end face positioned at the focal point to receive chopped optical radiation from said chopping component and to transmit received optical radiation to a remote location, and

(14) an opening in the housing of the optical fiber connector component which opening is positioned sufficiently close to the fiber's end face to emit radiation that has entered the fiber at an angle outside of the fiber's acceptance cone angle, and d) a means for aligning the first housing with the second housing.

3. The chopped radiation source of claim 1 in which the radiation source is a tungsten filament lamp.

4. The chopped radiation source of claim 1 in which the radiation source is a lamp which emits near infrared radiation.

5. The chopped radiation source of claim 2 in which each of the first and second housings is composed of metal.

6. The chopped radiation source of claim 2 in which each of the first and second housings is composed of stacked metal plates which have been bonded together.

7. The chopped radiation source of claim 1 in which said directing means is a beam steering prism.

8. The chopped radiation source of claim 1 in which said directing means is a beam steering mirror.

9. The chopped radiation source of claim 2 in which said directing means is a beam steering prism.

10. The chopped radiation source of claim 1 in which said means for adjusting radiation intensity is a bolt or screw.

11. The chopped radiation source of claim 1 in which the radiation source is a light emitting diode.

12. The chopped radiation source of claim 1 in which the radiation source is a light emitting diode capable of emitting ultraviolet, visible and near infrared radiation.

13. The chopped radiation source of claim 1 in which said directing means is a 45 degree beam steering prism.

14. The chopped radiation source of claim 1 in which said directing means is a flat mirror.

15. The chopped radiation source of claim 1 in which said collimating means is a sapphire ball lens.

16. The chopped radiation source of claim 15 in which the sapphire ball lens has a diameter of from 3 to 10 mm.

17. The chopped radiation source of claim 1 in which said radiation detector is a phototransistor.

18. The chopped radiation source of claim 1 in which said radiation detector is a photovoltaic or photoconductive diode.

19. The chopped radiation source of claim 2 in which said alignment means comprises posts mounted on the first housing which can be inserted into corresponding cavities present in the second housing.

20. The chopped radiation source of claim 1 in which the reed is made of spring steel.

21. The chopped radiation source of claim 1 in which the reed is from 15 to 50 mm in length, from 3 to 10 mm in height and from 0.2 to 0.8 mm thick.

22. The chopped radiation of claim 1 in which the chopper flag is an extension of the reed which has been formed by twisting the movable end of the reed by 90 degrees.

23. The chopped radiation source of claim 1 in which the reed is magnetically driven.

24. The chopped radiation source of claim 20 in which a solenoid coil is included in the chopping component to cause resonation of the reed.

25. The chopped radiation source of claim 1 in which the reed is a piezoelectric resonating reed.

26. The chopped radiation source of claim 22 in which the piezoelectric actuating material is polyvinylidene fluoride.

27. The chopped radiation source of claim 22 in which a pulsating AC or DC signal is used to provide resonance to the reed.

28. The chopped radiation source of claim 27 in which the AC or DC signal has a frequency between 30 and 1000 Hz.

29. The chopped radiation source of claim 27 in which the AC or DC signal has a frequency between 400 to 600 Hz.

30. A photometer which includes the chopped radiation source of claim 1.

31. A photometer which includes the chopped radiation source of claim 2.

32. A method for monitoring a chemical reaction comprising:
(a) inserting a probe which is connected to the photometer of claim 30 into a reaction stream and
(b) reviewing output from the photometer.

33. A method for monitoring a chemical reaction comprising:
(a) inserting a probe which is connected to the photometer of claim 31 into a reaction stream and
(b) reviewing output from the photometer.

34. A method for monitoring a chemical reaction comprising:
(a) placing a flow through cell connected to the photometer of claim 30 into a stream to be monitored and
(b) reviewing output from the photometer.

* * * * *